Jan. 24, 1967   D. J. STEINMEYER   3,300,581
FLAT SCREEN ELECTROLUMINESCENT X-Y DISPLAY
Filed March 16, 1964   4 Sheets-Sheet 1
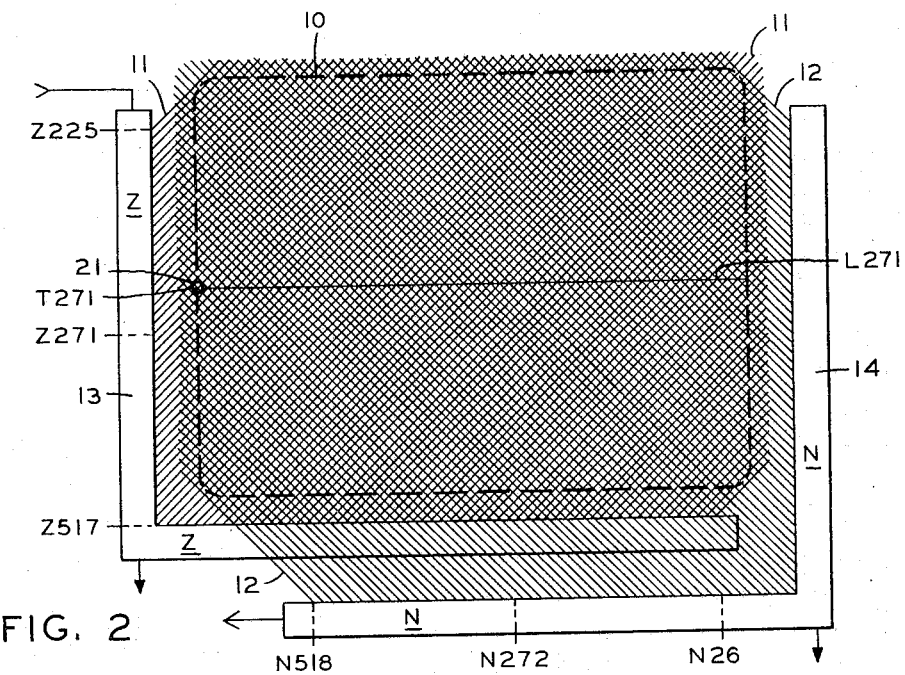
FIG. 2
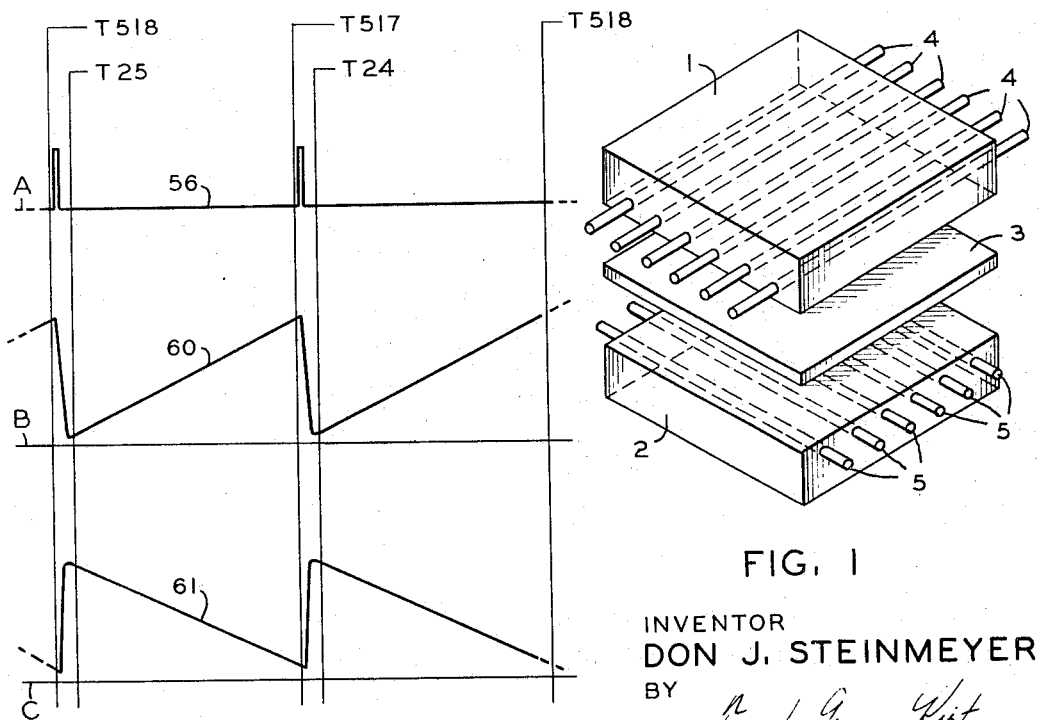
FIG. 7
FIG. 1
INVENTOR
DON J. STEINMEYER
BY
Frank Groom Kirz
ATTORNEY

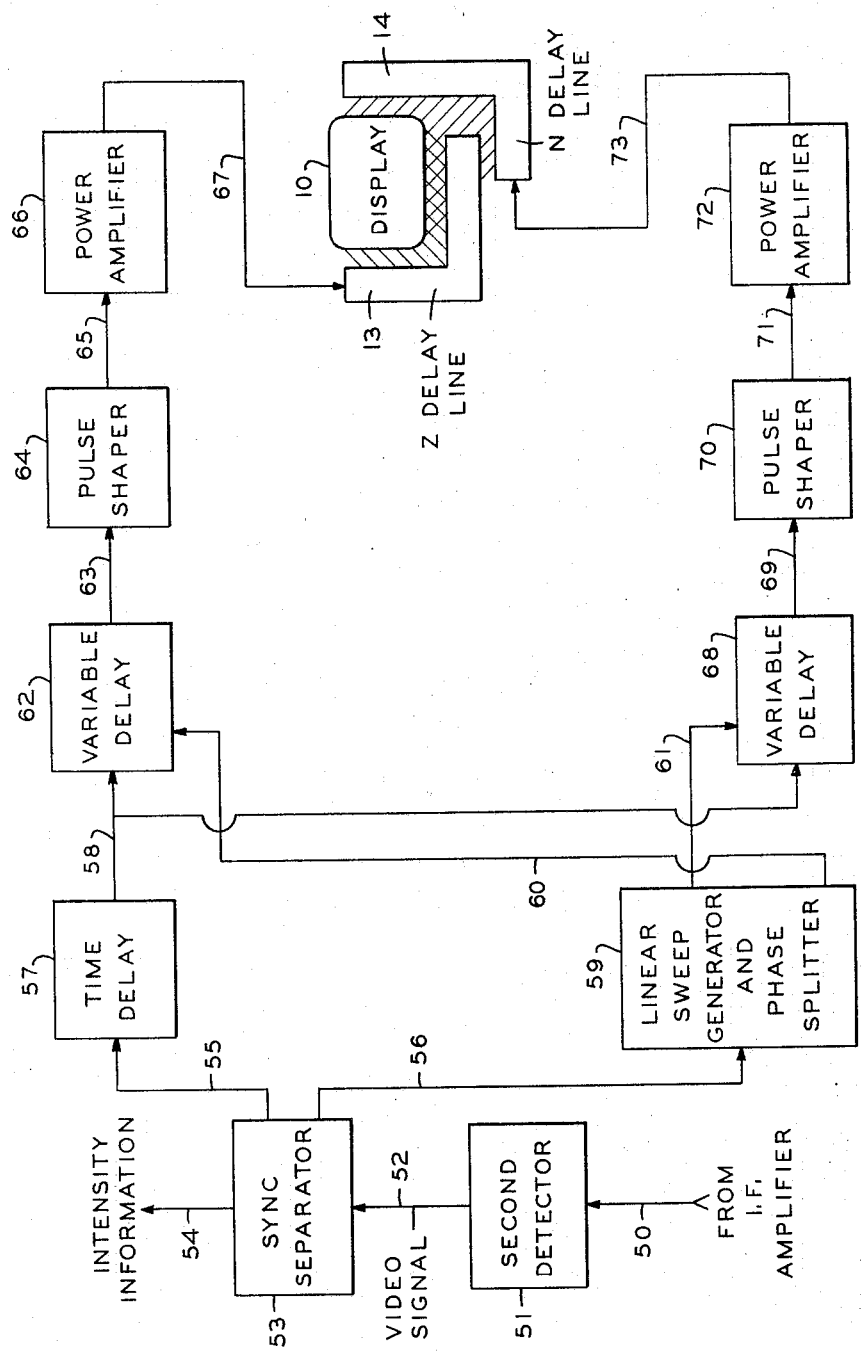

United States Patent Office 3,300,581
Patented Jan. 24, 1967

3,300,581
FLAT SCREEN ELECTROLUMINESCENT
X–Y DISPLAY
Don J. Steinmeyer, 3803 Kosciusko St.,
St. Louis, Mo. 63118
Filed Mar. 16, 1964, Ser. No. 352,126
5 Claims. (Cl. 178—7.5)

The principal object of this invention is to provide a flat electroluminescent display device, for use in television receivers, radar and sonar indicators, oscilloscopes, computer X–Y readouts and the like. This display device is useful for information storage, control panel indicators, aircraft cockpit instrumentation and many other applications.

Another object of my invention is to provide a crossed-wire two-dimensional display device which does not require a high vacuum. At the present time the design of transistorized television picture receivers has progressed to the point at which the only high-vacuum component in the entire receiver is the picture tube. It is also the most fragile and the second largest part in the set. A flat X–Y display in such a use will greatly reduce the volume of the receiver. In addition, since my flat display device has no filament, more space and weight can be saved by reducing the amount of cells needed to power the receiver.

An additional object of my invention is to provide a crossed-wire electroluminescent display device. In electroluminescence phenomena, light is produced by imposing an electric field on a suitable phosphor.

A further object of my invention is to provide an X–Y display device which requires no glass envelope or tube which is subject to shattering and which therefore requires a safety shield. In addition there is no high vacuum or other controlled atmosphere in my display device, nor is there a filament which may burn out and limit the useful life of my device.

Another most important object of my invention is to provide a novel arrangement of the conductors in a crossed-wire or crossed-conductor display device which greatly reduces the difficulty and expense associated with the conventional vertical scanning of such displays.

An additional object of my invention is to provide a novel approach to the scanning circuitry required for a television receiver which can be applied to such crossed-conductor displays as I provide.

A final object of my invention is to provide a novel arrangement of crossed-conductors in an electroluminescent device with a set of delay lines to attain a novel combination resulting in an X–Y display.

My invention consists in the improved construction, arrangement, and combination of parts hereinafter fully described and after specifically enumerated in the appended claims.

In order to enable others skilled in the art to which my invention most nearly appertains to make and use the same, I hereby proceed to describe its construction and operation in connection with the accompanying drawings, forming a part hereof, in which:

FIGURE 1 is an exploded view of one type of display suitable for use with my invention. It shows the internal construction of a crossed-conductor electroluminescent display;

FIGURE 2 is a schematic representation of a modification of the display of FIGURE 1, showing the arrangement of the conductors with respect to the field of view;

FIGURE 4 is a block diagram of the system which produces the requisite delays for my invention;

FIGURE 7 illustrates the high frequency vertical synchronization signal as used in my invention.

I will now refer to the drawings in detail. It will be noted that like numbers are given to like parts throughout the figures.

Figure 3:
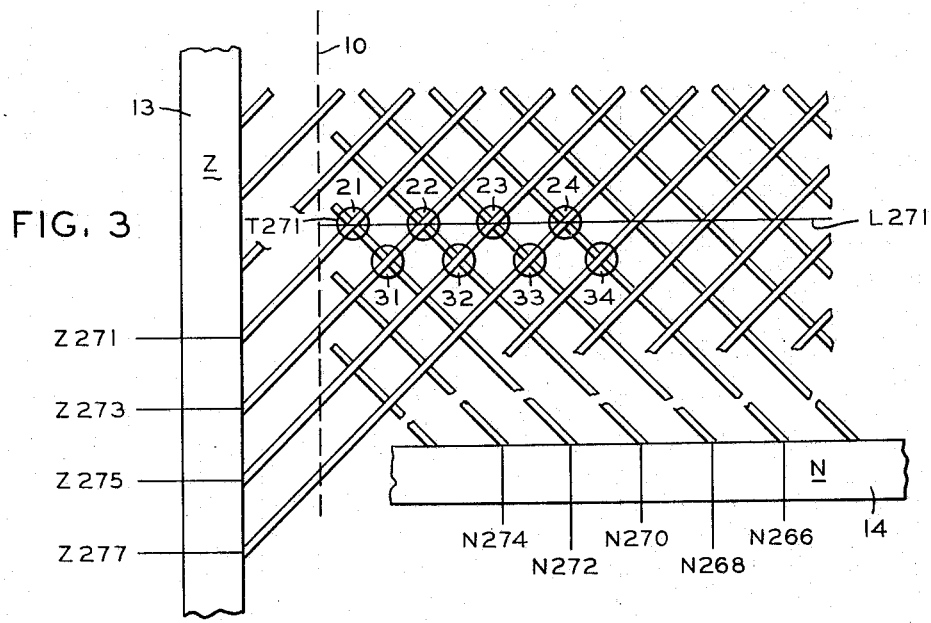
FIGURE 3 is a view of an enlarged segment of FIGURE 2, showing the apparent spot movement obtained by the use of pulse travel through delay lines.

The display device consists of two electrodes. These are numbered 1 and 2. Between these two electrodes is placed an electroluminescent phosphor layer 3. Each electrode consists of a dielectric such as a plastic and in this plastic is imbedded a set of parallel conductors 4, 4. When the sandwich is assembled, the conductors in the top electrode 1 are placed at right angles to those in the bottom electrode, which are numbered 5, 5.

When an E.M.F. is applied between one of the conductors 4, 4 in the top electrode 1 and one of the conductors 5, 5 in the bottom electrode 2, the phosphor surrounding their intersection will glow, or electroluminesce, producing a spot of light. Switching the E.M.F. to an adjacent intersection of similar conductors will produce an apparent spot motion which is equivalent to the scanning action using present practice in television receivers.

Preparation of a phosphor with appropriate characteristics is well understood and is given for example by Mager in U.S. Patent 2,566,349, as well as in the current technical press. The construction of a crossed-conductor device of the type illustrated in FIGURE 1 is described by Piper in U.S. Patent 2,698,915.

Producing a raster suitable for television reception on such a device is however extremely difficult and costly. The expense is so prohibitive that such a device, however attractive as a "flat TV picture," is not commercially feasible. A TV picture is produced by moving a spot of light from left to right, a line at a time, while simultaneously modulating the intensity of that spot in synchronization with the intensity of the spot being scanned. All the previous investigators of this field have suggested an arrangement of the conductors in the display device, according to FIGURE 1, in which the conductors are horizontal and vertical with respect to the picture.

To produce a single line of a raster with such a conductor configuration, that is, a horizontal and vertical one, it is necessary to energize a horizontal conductor and to keep it energized while all the appropriate vertical conductors are energized in rapid sequence. This means that one entire line of vertical conductors are energized in sequence while only one horizontal conductor is maintained energized. To produce the next line of scan, the E.M.F. is disconnected and moved down to the next, or the second next if interlacing is desired, horizontal conductor, and the vertical switching is repeated. Considerable practical difficulties arise when consideration is given to the devices required and available for the desired E.M.F. switching under these conditions.

In the standard United States TV raster, 494 of the 525 available scanning lines are used for the picture. The rest are used for synchronization, blanking, etc. Using one horizontal conductor for each of the 494 will produce a vertical resolution comparable to that of the basic system. To get equal resolution in the horizontal direction, 644 vertical conductors must be provided. Such a system will be able to resolve about 320,000 dots in each interlaced picture frame.

No problem is encountered in switching the vertical wires to move the spot horizontally. For the standard-resolution TV picture described above, a pulse must be applied to each successive vertical wire or conductor at 99 nanosecond intervals. This can easily be accomplished by utilizing a tapped electromagnetic delay line well known in the art of delay lines.

While scanning a line as described, however, an interval of 63 microseconds is required during which the applied energization must dwell on a given horizontal wire or conductor. This can only be accomplished by using more intricate and expensive means such as pulse registers, a commutator, switching tubes or the like. Compared to a delay line, the construction associated with each vertical scanning element would therefore be relatively complex, and a large number of such bulky units would be required for such a display.

FIGURE 2 illustrates the orientation proposed by my invention. The area of display normally exposed to view is shown by the rectangle 10, which is dotted. The conductor sets 11, 11 and 12, 12 form a forty-five degree angle in this viewing area. By this I mean that the sets of conductors, which are perpendicular to each other, are themselves as a group placed at a 45° angle to the vertical or horizontal lines of the ordinary display. Another way of saying this is that they are at an angle of 45° to a vertical line on the surface of the display field.

These sets of conductors are designated as the Z set, the 11, 11, and the N set, the 12, 12. Each of these sets is connected to the taps of an electromagnetic delay line, 13, and 14 respectively.

If a positive pulse 15 is applied to the Z delay line 13 and a negative pulse 16 is applied to the N delay line 14, the pulses will sequentially energize the conductors connected to each line. However, at first nothing will happen since the conductors energized do not intersect. And unless conductors that intersect are energized with opposite polarity, no field is set up which will cause the phosphor around that intersection to glow and form a spot of light.

It is not until the pulse reach the following condition that something observable will happen. I number the lines vertically 25 through 517. I number them horizontally 26 through 518. I will not illustrate all of the lines and hence I will use some of the numbers in this pair of series of numbers for other parts of my diagrams and figures.

It is not until the pulses reach the taps 271 and 272 two delay lines that any visible result will occur. By this I mean that the tap 271 on the Z delay line and tap 272 on the N delay line, is reached by the pair of pulses.

At that time, which I denominate as $T_{271}$, the conductors attached to these taps are both energized and intersecting. These are the two requirements of a spot of light appearing: that the conductors intersect and that the two pulses appear simultaneously (at $T_{271}$) at the intersection of the two conductors. One realizes that each conductor crosses most of the conductors of the other set, that is the set which is perpendicular to that first conductor. However if the pulses arrive at separate times, there will be no field and no resultant spot of light.

At $T_{271}$ a spot of light denominated as 21 will appear at the intersection at the left edge of the viewing area 10. FIGURE 3 is an enlarged version of that portion of FIGURE 2 which shows best what happened next. A short time ΔT after the pulses have reached the taps Z271 and N272, they have moved on to the next intersection at the taps Z273 and N270. Thus the spot of light appears at the next intersection, at point 22. At another short interval ΔT, the spot appears at the point 23, then at 24, and so on. The sequential lighting of the phosphor at the areas or points surrounding the intersections of these crossed conductors gives the appearance that the same spot of light is moving to the right in FIGURE 3, diagonally to the directions of the conductors.

When the device is being used as a television picture display tube, the above describes the scanning process for line 271, that is what is known as 271, the center line in the field of the ordinary standard United States television picture. It will be remembered that this line 271 however is the center line on the vacuum picture tube and is equivalent to the set of crossed-conductor intersections shown as 21, 22, 23, 24 and so on in FIGURE 3. It is not the same as the Z271 tap on the Z delay line.

In the following discussion I will describe the scanning of the next line, which would be the next line down, the line 271 on the standard television set.

Now let us suppose that the Z pulse 17 be applied to the Z delay line 13 in FIGURE 3, at a time ΔT before the pulse 18 reaches the proper intersecting conductor from the N delay line. The Z pulse would have advanced to the tap Z273 before the conductors energized by the pulses would be properly chosen. In other words the N pulse would not reach the intersecting conductors simultaneously with the Z pulse. Nothing will occur.

The first proper intersection will occur when taps Z273 and N272 and their associated conductors are energized simultaneously. When this set of requirements is met, the spot of light will appear at the point 31. As the pulses travel along their respective delay lines, the points 31, 32, 33, and 34 will glow sequentially. An apparent spot motion will occur, similar exactly to the motion previously described, however it will be displaced downward by one line.

In summary, then if pulses of proper polarity are applied to the delay lines Z and N, a series of spots, apparently similar to the horizontal lines of the standard television receivers, will eventually appear on the display. By applying the Z delay pulse before or after the N delay pulse the vertical position of this spot of light can be controlled.

It remains however to determine first, the small time interval ΔT between the delay line taps. Secondly we must determine the number of delay line taps and display conductors required in each set. Thirdly we must know the times, $T_{Nk}$ and $T_{Zk}$ which must elapse between the pulse application to the delay line inputs and the scanning line appearance. The values chosen will depend on the system whose picture is to be displayed. As an example I will now demonstrate the method of calculating the requirements for the NTSC or standard United States television system.

The lines of the United States television picture frame are arbitrarily numbered 1 through 521. The picture portion of the frame uses only lines 24 through 517. The remainder are used for vertical synchronization and blanking. The scanning frame consists of two interlaced fields. Lines 1, 3, 5 etc., through 525 are scanned first and constitute the odd field. The lines 2, 4, 6 etc., constitute the even field. Thus, line 25 is the first line in the odd field, and line 517 is the last.

The line numbers have been used in FIGURES 2 and 3 to designate the delay line taps which must be energized when the spot of light first appears at the left edge of the display. They will also be used later to designate the various pulse timing intervals.

Determination of the amount of time delay ΔT between successive taps on the delay lines requires consideration first of the time required to scan one line. Secondly it requires a knowledge of the requirements of the resolution desired.

In the United States standard display, it takes 63 microseconds to traverse one "line." However only 82% of this "line" contains picture information. The rest is used for horizontal blanking, synchronization and color burst. Thus the spot must remain in view for only 82% of 63 microseconds, or 52 microseconds.

As previously mentioned, only 492 of the 525 lines in one frame produce the visible picture. The picture aspect ratio is thus 4:3. Therefore to get horizontal resolution comparable to the vertical, 656 dots, in the form of conductor intersections, are needed across the viewing area.

Attainment of these requirements results in a time delay of 79.5 nanoseconds between successive delay line taps. This is the small time interval $\Delta T$ referred to above.

Equal quantities of conductors and taps are needed in both the Z and N sets of each. One wire and tap is needed for each of the 625 dots of conductor intersections required in a given line. Since the conductors run diagonally across the viewing area 10, additional taps and conductors are needed to fill out and permit scanning all the lines in the display. FIGURE 3 and its associated text showed above how the even field could be scanned by using conductor intersections staggered from those used for the odd field lines. This results in a 2:1 saving in conductors. Therefore an additional conductor needs be provided only for each of the 246 odd field lines. Thus each set needs 625 plus 246, or a total of 871 delay line taps and conductors if a full, comparable fidelity picture is to be obtained.

To those familiar with the present practice however it is obvious that the picture corners contain little of use to the average television receiver viewer. Most present-day television receivers cut off some of the corner areas to get as large a rectangular picture as possible in a given display tube diameter. Following this practice with an electroluminescent display results in a similar direct saving on delay line taps and conductors. Following current practice, as much as a 15% reduction could be taken with relatively little degradation of viewing content. However, it will be noted that the discussion which follows assumes a full rectangular viewing area.

Discussion of the display's operation above showed that it is necessary to apply the pulses to the delay line inputs at varying times before the beginning of the line to be scanned. This is necessary to insure that the spots of light 21, 31, etc., will appear at the left side of the viewing area 10 simultaneously with the arrival of the picture intensity information. Determining these times, that is these time advances consists merely of counting the delay line taps which must be passed before the pulse energizes the correct wire.

Figure 5:
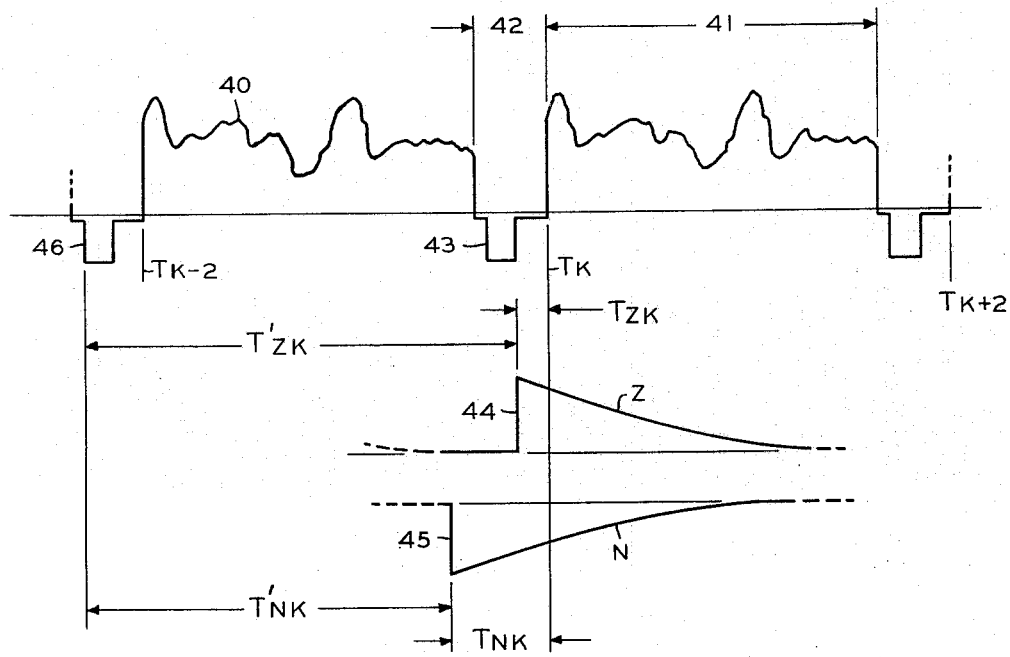
FIGURE 5 shows a typical video signal as it appears out of the second detector stage of a standard television receiver.

The upper portion of FIGURE 5 shows a typical video signal 40 as it appears out of the second detector stage of a television receiver. It represents two lines of a standard United States television display. The major portion 41 conveys picture intensity information. This portion is preceded by an interval 42 which contains horizontal synchronization 43, blanking, and color burst pulses. The times $T_{k-2}$, $T_k$, and $T_{k+2}$ denote the times at which the picture intensity information for the $k-2$, $k$, and $k+2$ lines respectively are first available. The fact that these numbers differ by increments of two reflects the interlaced nature of the standard display in which only every other line is scanned in any one given field.

The lower portion of FIGURE 5 shows typical Z and N pulses, 44 and 45 respectively, which must be generated to properly scan the picture line $k$. As was previously explained, both must precede the first arrival of intensity information $T_k$. These precedence or anticipation times are shown as $T_{Zk}$ and $T_{Nk}$ in the lower portion of FIGURE 5.

To scan the line 25 of FIGURE 2, the first picture line in the frame, conductor numbered 25 in the Z set and that numbered 26 in the N set must be simultaneously energized at time $T_{25}$. Since conductor Z25 is connected to the Z delay line input, the Z pulse may be applied immediately at $T_{25}$. Thus $T_{Z25}$ equals zero microseconds. However, the N pulse must pass 246 taps on the N delay line before it reaches the conductor N26. Therefore, the N pulse must be applied to the N delay line some 79.5 nanoseconds times 246, or some 19.56 microseconds before $T_{25}$. Consequently $T_{N25}$ is equal to this 19.56 microseconds.

The scanning of line 271 of FIGURE 2, in the very center of the display field was described previously. By means of FIGURE 3, the operation was explained. FIGURE 2 shows that the pulses must travel equal distances along the delay lines before they reach taps Z271 and N271. Each Z and N pulse must therefore pass one-half of 246 taps or 123 taps. Thus the delay time changes, that is the time advance must be 79.5 nanoseconds times 123, or some 9.78 microseconds before $T_{271}$. This we can write $T_{Z271}=T_{N272}=9.78$ microseconds.

To scan the line 517 at the bottom of the display of FIGURE 2, the N pulse must be applied immediately at $T_{N518}$. The Z pulse however must be applied a full 19.56 microseconds before $T_{N518}$, so that it may travel past the required number of Z delay line taps (which number is again 246) for the Z pulse to arrive simultaneously at the line 517 when the N pulse arrives, to produce the required spot of light through the phosphor with the field. For line 517 therefore:

$$T_{N518}=0;$$

$$T_{Z517}=19.56 \text{ microseconds.}$$

Now for the general statement of these interrelationships. For lines in between these limiting conditions, the time advances $T_{Nk}$ and $T_{Zk}$ must be varied depending on the position of the line $k$ in the set which is being scanned. As $k$ increases from 25 to 517, $T_{Zk}$ increases linearly, while $T_{Nk}$ decreases linearly. For the standard United States television receiver, the general statements of these time advances in nanoseconds are:

$$T_{Zk}=(k-25)\ 38.75; \text{ and}$$
$$T_{Nk}=19,500-(k-25)\ 38.75.$$

It is rather difficult to design circuits with negative time delay. In fact, it is impossible. Therefore, to make the N and Z pulses, 45 and 44, respectively, precede $T_k$, the horizontal synchronization pulse 46 of FIGURE 5 must simply be sensed and appropriately delayed to generate these N and Z pulses. The answer to this requirement is quite simple. We must simply generate delay times $T'_{Zk}$ and $T'_{Nk}$ rather than the advance times $T_{Zk}$ and $T_{Nk}$. The process is often employed in the design of timing circuits. It amounts to simply shifting the time reference point. The system which produces these requisite delays is shown in FIGURE 4 in block diagram or functional form. The detailed configuration of the circuits represented as blocks in this figure is well-known in the art. For thorough reference works see the following leading texts: Chance, et al., "Waveforms," Millman and Taub: "Pulse and Digital Circuits," and Strauss: "Wave Generation and Shaping." These books are fully illustrative of the art of designing such circuit elements; their publication dates span a period of some 11 years, which demonstrates the length of time that such detailed knowledge has been available, and shows the relative sophistication of the art of circuit design. All the circuit elements shown in FIGURE 4 are standard and can be designed and built by any electronic engineer reasonably skilled in the art of circuit design.

The following remarks explain the function of the elements of the system of FIGURE 4 which produces the the requisite delays.

The process begins with the intermediate frequency signal (IF) 50, entering the second detector 51. Here the video amplitude modulation is removed and the video signal 52 is sent on to the sync separator 53. A typical video signal 52 is shown as the waveform 40 of the upper portion of FIGURE 5. The sync separator 53 clips the synchronization signals 46 and 43 and sends the remaining intensity information 54 of FIGURE 4 on to the video amplifiers. The circuitry thus far is the same as that found in any modern television receiver.

Figure 6:
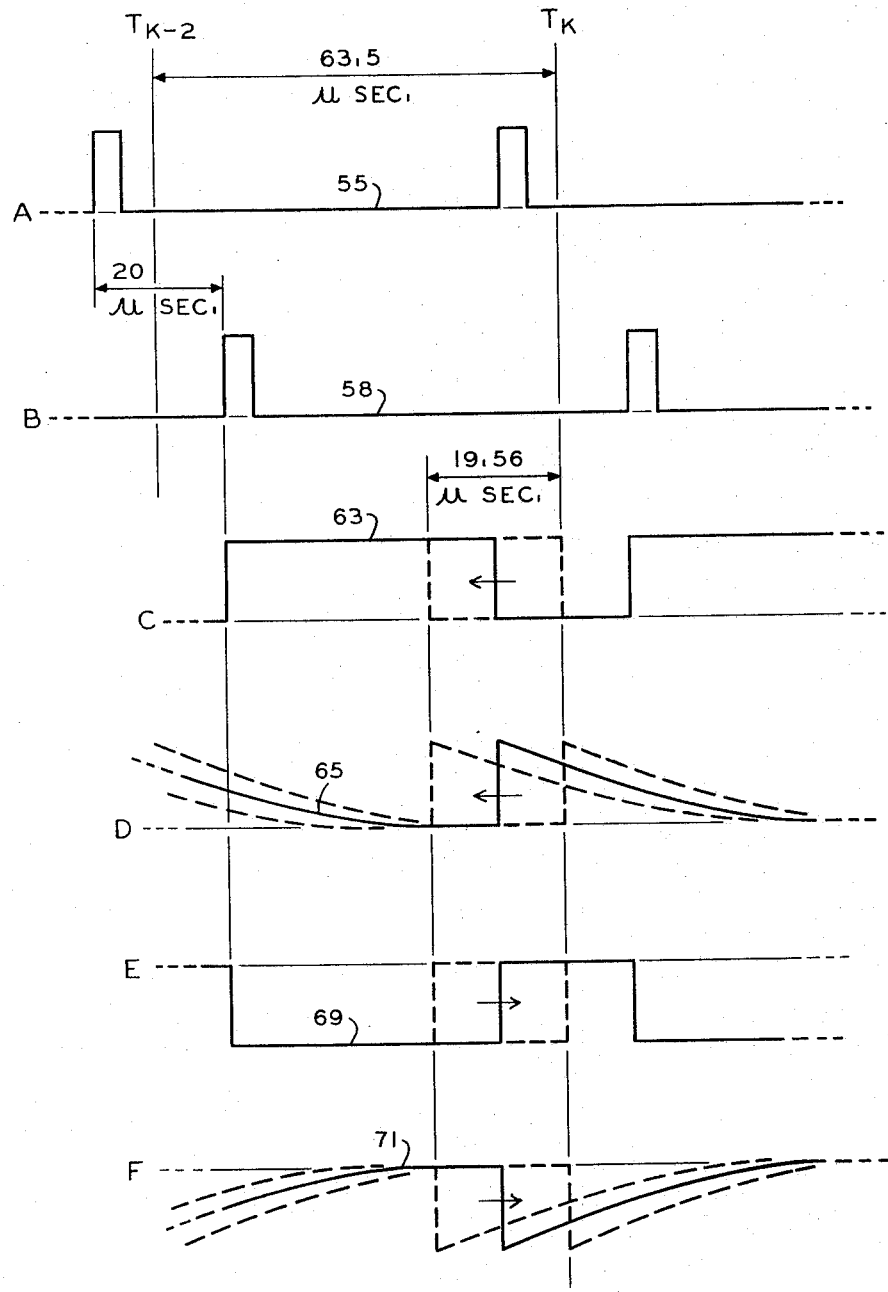
FIGURE 6 illustrates the high frequency horizontal synchronization signal.

The sync signals 55 and 56 thus obtained are shown in FIGURES 6A and 7A. Note that the periods of the two waveforms differ by a factor of 262.5.

The vertical sync signal 56 goes to a linear sweep generator 59 of FIGURE 4, which converts the pulses 56 to a synchronous sawtooth waveform. The output of the sweep generator 59 consists of two waveforms 60 and 61, which vary in opposite phase to each other. The two waveforms 60 and 61 are shown in FIGURES 7B and 7C.

The higher frequency horizontal sync signal 55 is sent in FIGURE 4 to a circuit 57 which produces the 20 microsecond time delay shown in FIGURES 6A and 6B. This fixed delay is required to prevent unreasonable demands on the duty cycle of the two subsequent variable delay circuits 62 and 68.

From this point on, the two channels of FIGURE 4 lose their identity as "vertical" and "horizontal," channels and are henceforth referred to as "Z" and "N" channels. These two channels are similar in their operation, so only the Z channel will be described in its detailed action.

The delayed horizontal pulse 58 is fed to a variable delay circuit 62. This circuit not only broadens the pulse, but delays it in proportion to the instantaneous amplitude of the vertical sawtooth signal 60 applied. The output then is a square wave 63 whose width depends on the delay generated in the circuit 62.

This square wave is sent to a pulse shaper 64, which generates a sharply-rising sawtooth 65. The rise of the sawtooth is simultaneous with the fall of the input squarewave 63. The square wave 63 and the sharply-rising sawtooth 65 are shown in FIGURES 6C and 6D respectively.

The sawtooth 65 is then sent to a power amplifier 66 which provides the amplification and output impedance needed to drive the display delay line 13, that is the Z delay line, with the signal 67.

The circuit reasoning behind the use of the sawtooth waveform follows. The sawtooth waveform is used to energize the display conductors because it is a high-energy shaped waveform. A very narrow pulse could be used instead. However, even small losses and phase distortion in the channel would degenerate such a narrow pulse into a useless blob. Such degradations will necessarily affect a sawtooth, but to a much smaller extent. The principal effect will be to lengthen the rise time. Enough amplitude will remain to produce a usable and efficient signal.

Now let us examine the characteristics of the N channel. The N channel differs from the Z channel in two respects. First, the signals in the N channel are all the negatives of those in the Z channel. Comparisons of the FIGURES 6C, 6D, 6E, and 6F will make this obvious.

Second, the variable delay circuit 68 of the N channel is supplied with a horizontal sync waveform 61 which is inverted with respect to that denominated by 60, which is supplied to the Z channel. Therefore the delay produced by 68 increases when that of 57 in decreasing. FIGURES 6C and 6E illustrate this effect. The small arrows on the wavefronts show the direction each wavefront moves as lines farther down from the top of the raster are scanned. The dashed lines show the waveform positions when the extreme top and bottom lines are being traced.

The following paragraphs discuss the types of circuitry which will fulfill the required functions outlined in FIGURE 4. Exact schematic diagrams are not given since the design of the circuits is so well-known in the art, and has been for some years. In addition, the exact circuit constants and configurations will depend heavily on the choice of active components, that is transistors, electron tubes, and the like. References to the literature have been included which will give the design and representative examples of these circuits.

The linear sweep generator 59 must fulfill the following requirements:

First, it must provide a linearly increasing waveform between $T_{25}$ and $T_{517}$, illustrated in FIGURE 7B.

Second, the waveform must fly back to its original value before $T_{24}$.

Third, the sweep generator must also provide a negative-going wave 61, illustrated in FIGURE 7C, which will meet these same requirements for the N channel.

A thoroughly satisfactory choice for this circuit element is a Miller sweep circuit such as is completely described in Chapter 7 of the book entitled "Wave Generation and Shaping" by Strauss; in addition I prefer to use a phase-splitting amplifier on the output.

The fixed time delay 57 may be an electromagnetic delay line. However, for experimental purposes, it may be the same type of circuit used in the subsequent variable delay circuits 62 and 68, from FIGURE 4. Information on the design of delay lines may be found in Chapter 22 of the book entitled "Waveforms," by Chance et al. Such delay lines are also commercially available.

It will be seen from FIGURE 4 that the variable delay circuit 62 must accept two inputs. The first input is the vertical sawtooth 60 whose amplitude determines the time delay produced. The second input is the horizontal sync pulse 58 which initiates the delay. This circuit must have a linear time delay versus sawtooth amplitude characteristic.

Many circuits are available which will behave in this manner. However the one which best meets the requirements is the phantastron, which is described for example on pages 56–2 to 57–6 of the Navy Bureau of Aeronautic's "Handbook of Preferred Circuits." It is also described on pages 197 to 204 of the Chance et al. book described above.

Actually the phantastron circuit has been described in many places throughout the literature. The phantastron circuit characteristically generates a square wave 63, see FIGURE 6C, whose rise coincides with the input horizontal sync pulse 58, and whose width varies linearly with the instantaneous amplitude of the vertical sawtooth 60.

In addition the following requirements must be met. The pulse shaper 64 must:

First, differentiate the phantastron's output 63.

Second, clip off the resultant positive spike.

Third, clamp the negative spike.

Fourth, use an integrating circuit to shape the negative spike into a sawtooth.

Fifth, invert the waveform to give a positive-going output 65.

The circuitry which can accomplish the above requirements is elementary. Chapters 2 and 4 of Millman and Taub's book: "Pulse and Digital Circuits," have a good discussion of the various techniques in the art for the accomplishment of these objectives.

The amplifier 66 must provide the power needed to drive the Z delay line 13. Its specifications depend on first the surge impedance of the delay line, and second the E.M.F. needed on the display's conductors, to produce the spot of light.

The amplifier 66 must also produce a minimum of distortion to the pulse being amplified. It is desirable that its output impedance approximate the delay line's surge impedance so that any reflected pulses will be attenuated and will not produce ghosting on the display field.

In addition we must recognize that delay lines which have large amounts of delay will also have large amounts of attenuation. To overcome this disadvantage, it will be necessary to insert amplification at frequent points along the line to prevent the display from being degraded. Of many possible methods, the most statisfactory is the use of distributed amplifier techniques in this connection.

The preceding description of a diagonally scanned display utilizing crossed conductors and the electroluminescent effect, has been presented in terms of the production of a raster compatible with the standard NTSC television picture. It can of course be seen that numerous other applications are possible, such as aircraft control panels, computer readouts, and the like. In fact, this device has utility wherever a raster-type scan can be employed. Those skilled in the art will recognize that many modifications, changes, and variations are possible in the invention without departing from the inventive concept, which basically consists of using fixed delay lines and variable delay circuits to scan diagonally an array of crossed conductors, to produce an X–Y display compatible with present displays, and replacing the fragile, bulky tube and filament used in television receivers, oscilloscopes, and the like. I do not intend that the invention be limited in scope by any definition other than those of the appended claims.

What I claim is:

1. In an electroluminescent display device of the type described, the combination of:
    a first set of conductors,
    a second set of conductors, disposed at right angles to said first set of conductors, an electroluminescent film disposed between and contacting said two sets of conductors,
    an electromagnetic delay line associated with said first set of conductors,
    an electromagnetic delay line associated with said second set of conductors, and
    a scanning circuit, said first and second set of conductors being individually and sequentially energized momentarily through said delay lines by the scanning circuit such that scan lines are produced along parallel paths which are angularly disposed with respect to both sets of conductors.

2. In an electroluminescent display device of the type described, the combination of:
    a first set of conductors,
    a second set of conductors disposed at right angles to said first set of conductors,
    an electroluminscent film deposited between said two sets of conductors;
    an electromagnetic delay line assocaited with said first set of conductors,
    an electromagnetic delay line associated with the second set of conductors and a scanning circuit, said first and second set of conductors being individually and sequentially energized momentarily through said delay lines by the scanning circuit such that scan lines are produced along parallel paths which are angularly disposed with respect to both sets of conductors in said electroluminescent film.

3. In an X–Y display of the type described, the combination of:
    a first set of conductors,
    a second set of conductors disposed at right angles to said first set of conductors,
    an electroluminescent film disposed between and contacting said two sets of conductors,
    a horizontal sync signal,
    a vertical sync signal,
    a time delay circuit associated with said first set of conductors, through which said horizontal sync signal successively energizes said first set of conductors,
    a time delay circuit associated with said second set of conductors, through which said vertical sync signal successively energizes said second set of conductors,
    and a scanning circuit, said first and second sets of conductors being individually and sequentially energized at intersections of said sets of conductors momentarily through said delay circuits by said scanning circuit such that scan lines are produced along parallel paths which are angularly disposed with respect to both sets of conductors in said electroluminescent film.

4. In a thin X–Y display of the type described, the combination of:
    a first set of signal conductors,
    a second set of signal conductors disposed at right angles to said first set of conductors,
    an electroluminescent film disposed between said two sets of conductors,
    a sync separator generating a horizontal sync signal and a vertical sync signal,
    an electromagnetic delay circuit provided with taps, to which is connected said first set of conductors and through which said horizontal sync signal successively energizes said first set of conductors,
    an electromagnetic delay circuit provided with taps, to which is connected said second set of conductors and through which said vertical sync signal successively energizes said second set of conductors,
    and a scanning circuit, said first and second set of conductors being individually and sequentially energized momentarily through said delay circuits by the scanning circuit such that scan lines are produced along parallel paths which are angularly disposed with respect to both sets of conductors, and thereby generating spots of light in said electroluminescent film in a raster compatible with the standard television raster.

5. In an X–Y display device requiring a raster-type scan compatible with the standard television raster, the combination of:
    a fist set of signal conductors,
    a second set of signal conductors disposed at an angle to said first set of conductors,
    an electroluminescent film disposed between and actuated by signals between said two sets of conductors,
    a sync separator genertaing a horizontal sync signal and a vertical sync signal,
    an electromagnetic delay line provided with taps, to which are connected in succession the conductors of said first set of conductors, and through which said horizontal sync signal successively energizes said first set of conductors in a shifted-time pattern,
    an electromagnetic delay line provided with taps to which are connected in succession the conductors of said second set of conductors, and through which said vertical sync signal successively energizes said second set of conductors in a shifted-time pattern, so that both sets of conductors are individually and sequentially energized momentarily through said delay lines such that scan lines are produced along parallel paths which are angularly disposed with respect to both sets of conductors in said electroluminescent film in the form of a television raster.

References Cited by the Examiner

UNITED STATES PATENTS 2,955,231   10/1960   Aiken _____ 313—108.1
3,096,516   7/1963   Pendleton et al. _____ 178—7.50

DAVID G. REDINBAUGH, *Primary Examiner.*

R. L. RICHARDSON, *Assistant Examiner.*